United States Patent
Boecker

(10) Patent No.: US 7,100,638 B2
(45) Date of Patent: Sep. 5, 2006

(54) VALVE FOR A HYDRAULIC POWER STEERING

(75) Inventor: Martin Boecker, Korschenbroich (DE)

(73) Assignee: TRW Automotive GmbH, (DE)

( * ) Notice: Subject to any disclaimer, the term of this patent is extended or adjusted under 35 U.S.C. 154(b) by 0 days.

(21) Appl. No.: 11/144,394

(22) Filed: Jun. 3, 2005

(65) Prior Publication Data

US 2005/0268975 A1    Dec. 8, 2005

Related U.S. Application Data

(63) Continuation of application No. PCT/EP03/13369, filed on Nov. 27, 2003.

(30) Foreign Application Priority Data

Dec. 3, 2002   (DE) ................. 202 18 733 U

(51) Int. Cl.
*B62D 5/083*   (2006.01)

(52) U.S. Cl. ................. 137/625.21; 180/422; 180/441

(58) Field of Classification Search ........... 137/625.21, 137/625.22, 625.23, 625.24; 180/422, 441, 180/443; 91/375 A, 375 R
See application file for complete search history.

(56) References Cited

U.S. PATENT DOCUMENTS

| | | | |
|---|---|---|---|
| 2,260,979 A * | 10/1941 | Morin et al. ........... 137/625.24 |
| 4,871,040 A * | 10/1989 | Zuraski et al. ............ 180/422 |
| 5,511,630 A * | 4/1996 | Kohata et al. ............ 180/422 |
| 5,813,492 A | 9/1998 | Langkamp |
| 5,845,557 A | 12/1998 | Speidel et al. |
| 5,870,941 A | 2/1999 | Spillner et al. |
| 6,298,940 B1 | 10/2001 | Bohner et al. |

FOREIGN PATENT DOCUMENTS

| | | |
|---|---|---|
| DE | 195 17 871 | 8/1996 |
| DE | 195 15 543 | 10/1997 |
| DE | 198 28 816 | 12/1999 |
| GB | 2 057 371 | 4/1981 |

\* cited by examiner

*Primary Examiner*—John Rivell
(74) *Attorney, Agent, or Firm*—MacMillan, Sobanski & Todd, LLC

(57) ABSTRACT

In a valve for a hydraulic power steering, comprising a first valve element and a second valve element which from a central position can be rotatably displaced relative to each other to a limited extent in the one or other direction in order to generate a steering assistance, it is provided that one of the valve elements can be rotatably displaced from a neutral position into the one or other direction relative to an associated shaft and that a coupling mechanism is provided which limits the displacement in rotation of the valve element relative to the shaft and urges the valve element into the neutral position.

28 Claims, 10 Drawing Sheets

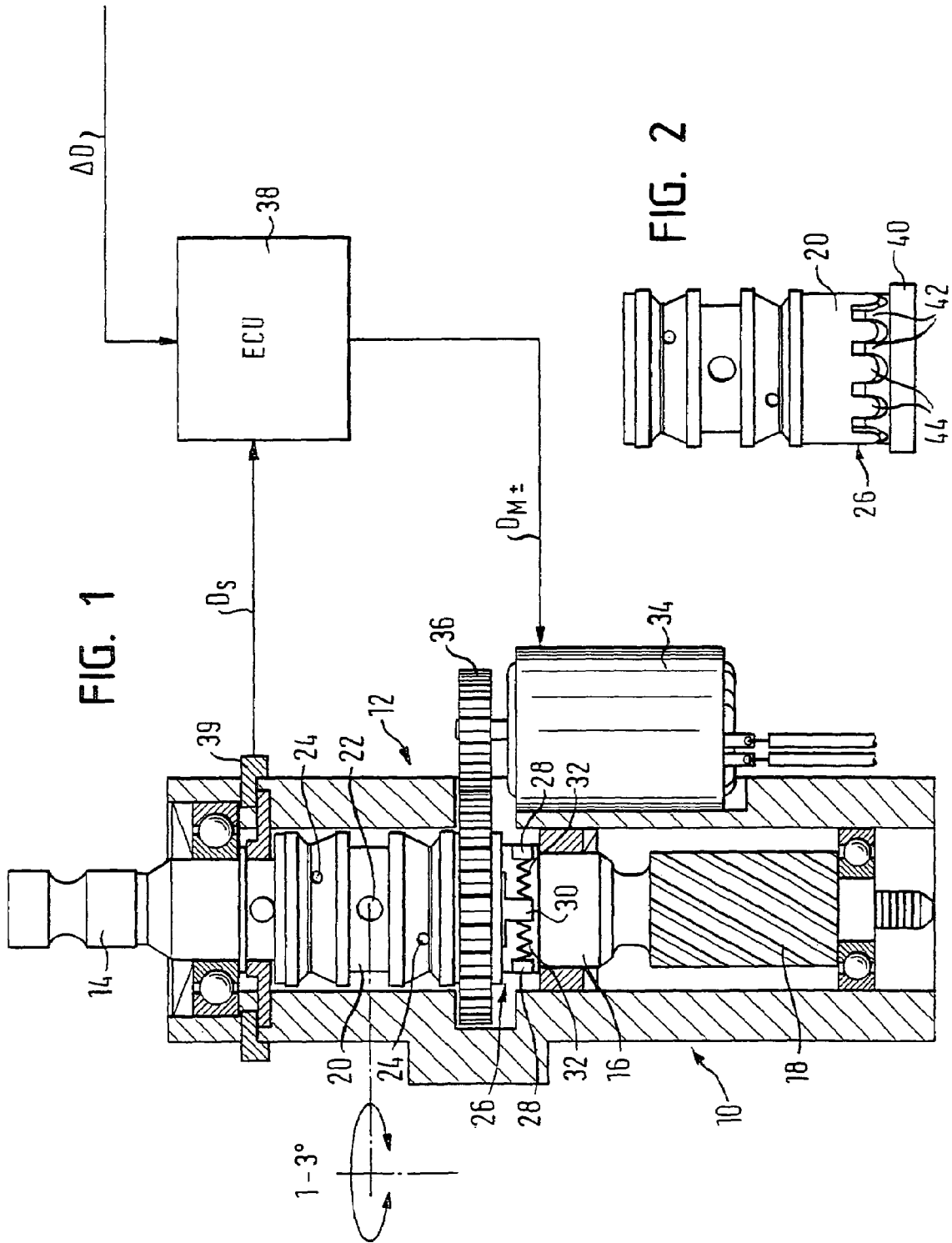

FIG. 6
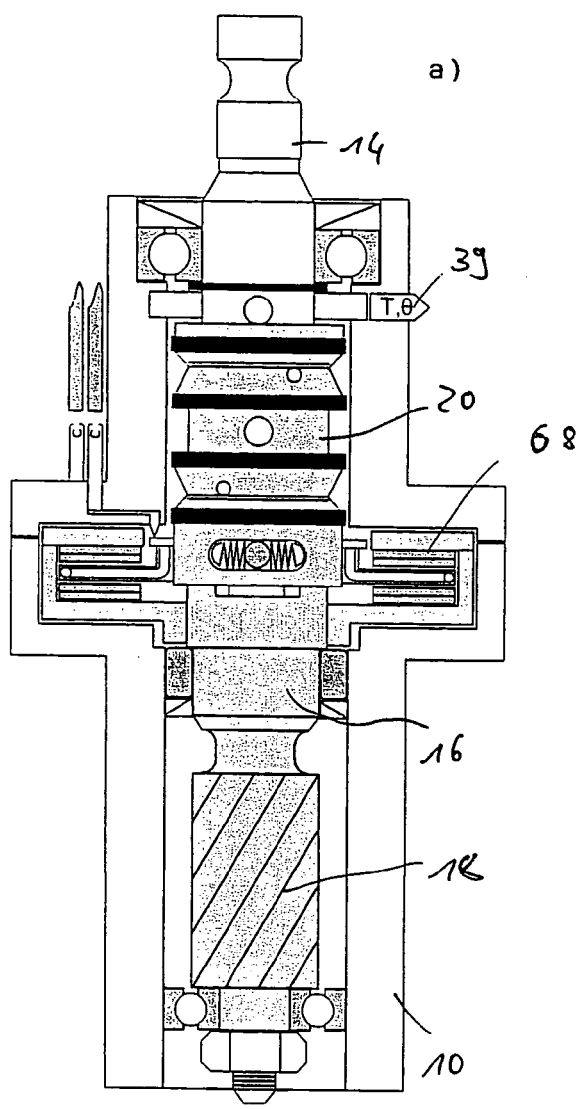
a)
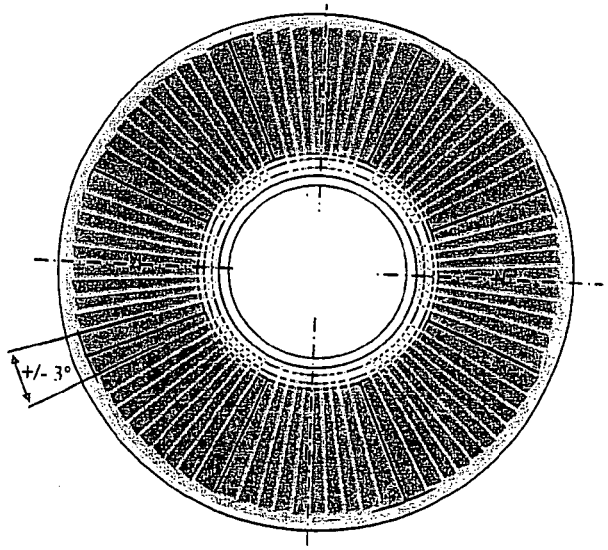
b)
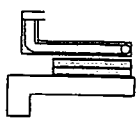
c)

FIG. 7
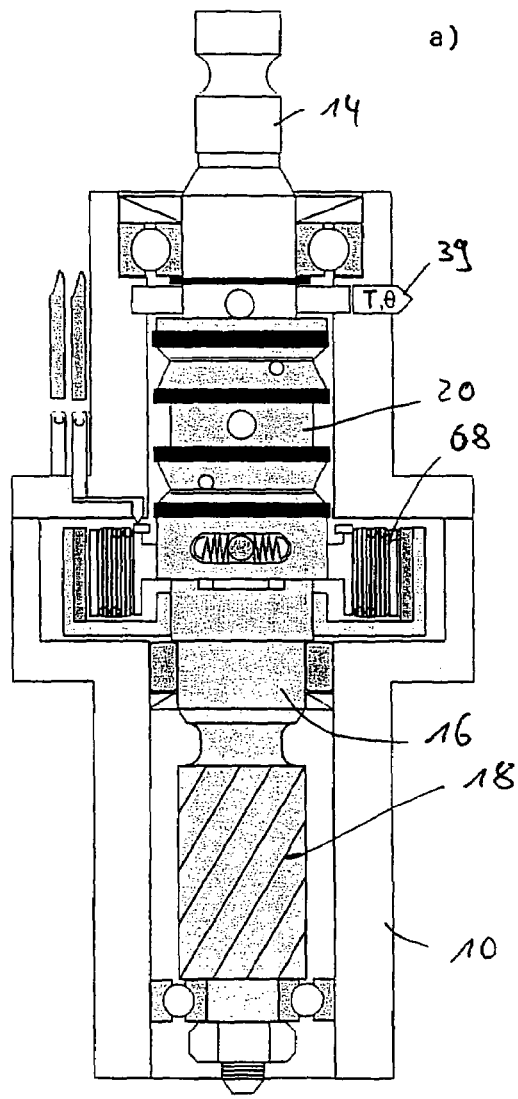
a)
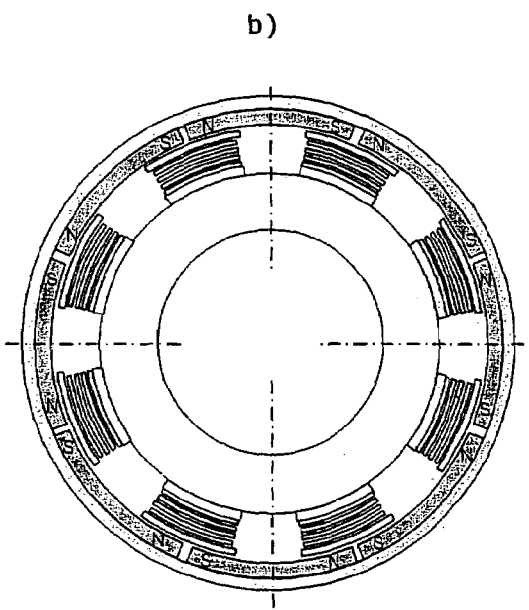
b)

FIG. 8
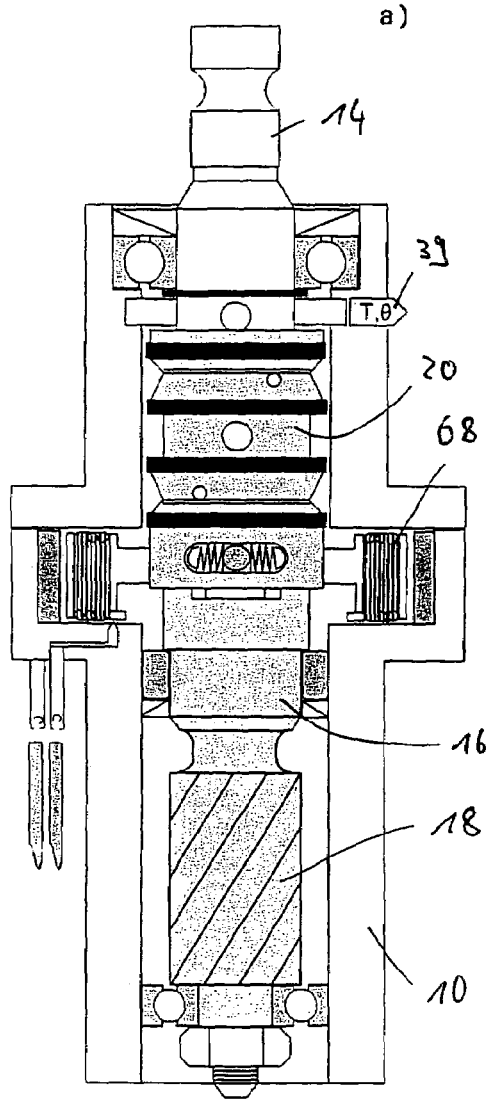
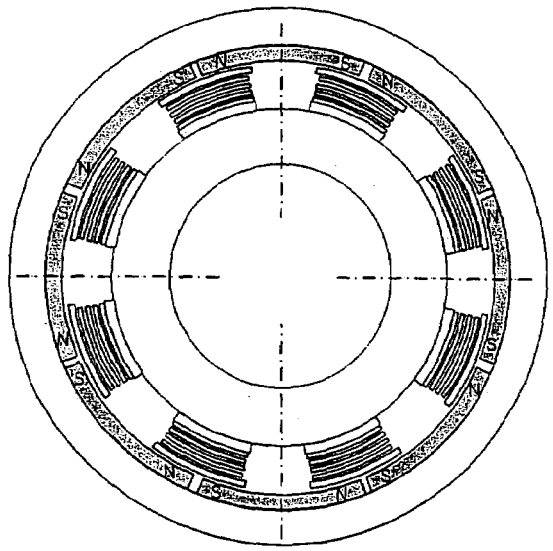

FIG. 9
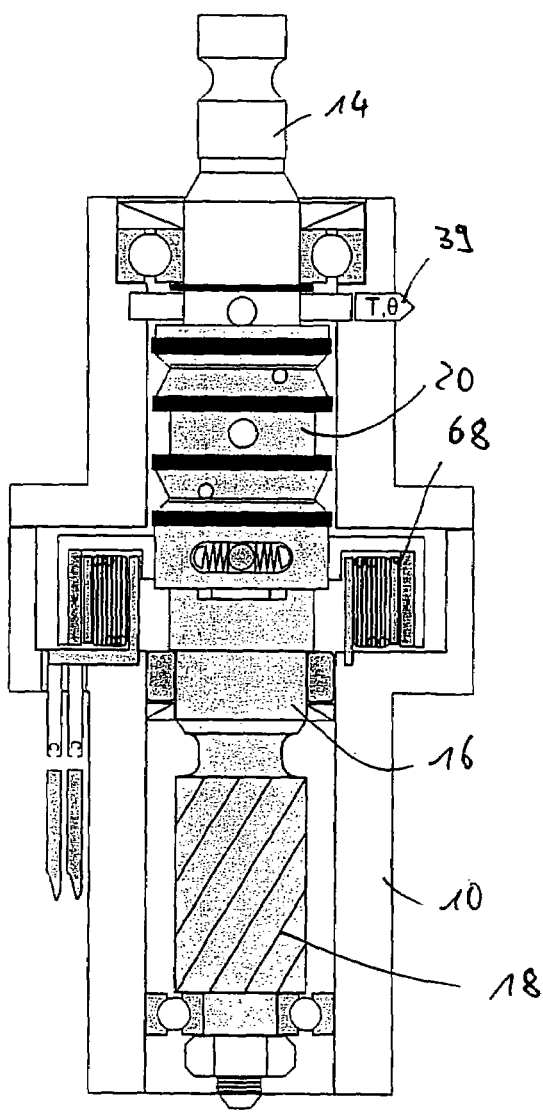
a)
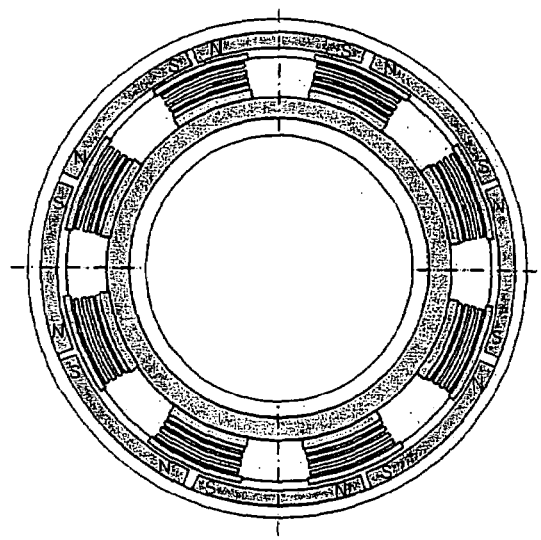
b)

VALVE FOR A HYDRAULIC POWER STEERING

CROSS REFERENCE TO RELATED APPLICATIONS

This application is a continuation of International Application No. PCT/EP03/13369 filed Nov. 27, 2003, the disclosures of which are incorporated herein by reference, and which claimed priority to German Patent Application No. 202 18 733.0 filed Dec. 3, 2002, the disclosures of which are incorporated herein by reference.

This invention relates to a valve for a hydraulic power steering.

BACKGROUND OF THE INVENTION

Hydraulic power steerings usually employ hydraulic rotary slide valves, in which one valve element is connected with an input shaft of the valve and a second valve element is connected with an output shaft of the valve. The input shaft is connected with the steering wheel, and the output shaft is connected with a pinion which is part of a steering gear. The input shaft and the output shaft are usually coupled with each other by a torsion bar, so that they can be rotatably displaced relative to each other when the moment of resistance of the torsion bar is overcome. At the same time, the torsion bar specifies a central position of the valve, in which the valve provides no power assistance. When the input shaft and the output shaft and thus the two valve elements are rotatably displaced relative to each other, there is obtained a hydraulic flow in the one or other direction, which can be converted into a power assistance force.

At present, many efforts are made to develop the known power steerings to the effect that a power assistance force determined by a control unit can be superimposed on the power assistance force specified by the user. In this way, the steering characteristic of the power steering can be influenced in many ways, so that for instance the torque felt at the steering wheel can be influenced, the valve characteristic can be modified, the return to the central position can be influenced, a damping can be generated, an automatic actuation of the steering gear can be achieved, a mismatch of the central position can be compensated, a force resulting from the wheels, for instance due to a unilateral pressure drop in the tire or a braking operation with different friction values on the one and on the other side of the vehicle, can be counteracted, or non-uniform wheel loads can be attenuated. The steering characteristic of a rotary slide valve can be influenced in that one of the valve elements, usually the valve sleeve connected with the output shaft and hence with the pinion, is not firmly mounted at the output shaft, but can be rotatably displaced relative to the same. The displacement in rotation of the valve sleeve relative to the output shaft can be caused by an electric motor or by coils which adjust the valve sleeve by electromagnetic forces.

However, such active rotation of the valve sleeve raises two problems. The first problem consists in that the position of the valve sleeve must be controlled with a very high angular accuracy. Since the output shaft can usually rotate by four revolutions between the two steering stops, the drive means for the valve sleeve must be able to displace the same in rotation over an angular range of 3 to 4 steering wheel revolutions with an accuracy in the order of 0.02°. This requires a very expensive angle sensor, which can operate with the required accuracy. The second problem relates to the failure safety. In the case of a failure of the drive means, the angular position of the valve sleeve can no longer be predicted, so that the power steering can no longer operate properly. In the worst case, the driver looses control over the vehicle.

BRIEF SUMMARY OF THE INVENTION

The object of the invention consists in creating a valve for a power steering system in which it is possible to actively influence a valve element, in order to influence the valve characteristic and hence the steering characteristic in a desired way, but at the same time there is achieved a high failure safety in connection with low requirements as to the precision of the drive means used.

For this purpose, the invention provides a valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position. The invention is based on the fundamental idea that the valve element, which can be rotatably displaced to influence the valve characteristic, should always be urged into the neutral position, which it would also take if it was firmly connected with the associated shaft. From this neutral position, the valve element can be rotatably displaced into the one or other direction, restoring forces having to be overcome to effect such displacement in rotation. These restoring forces are so great that they hold the valve element that can be rotatably displaced in the neutral position, if no forces are exerted by the drive means on the valve element that can be rotatably displaced. In this way, an extremely high failure safety is obtained. For as soon as the drive means for the valve element that can be rotatably displaced has ceased to operate, the same remains in its neutral position, so that the valve can operate in a conventional way. By urging the valve element that can be rotatably displaced into the neutral position, it is also avoided that it is actively readjusted into the actual desired position with each actuation of the valve. Instead, it is sufficient to only adjust the valve element that can be rotatably displaced from its neutral position when the valve characteristic should be influenced.

In accordance with one embodiment of the invention, the coupling mechanism has two springs which act in peripheral direction of the shaft, wherein the valve element associated to the coupling mechanism is provided with a stop, wherein two abutments are provided at the shaft, one of which is disposed on the one side of the stop and the other on the other side of the stop, and wherein one of the two springs is disposed between the one abutment and the stop and the other spring is disposed between the stop and the other abutment. In this embodiment, a very compact structure is obtained, by means of which the valve element that can be rotatably displaced can reliably be urged into the neutral position.

In accordance with a preferred embodiment of the invention it is provided that the valve element associated to the coupling mechanism is provided with a slot which is aligned at an angle with respect to the longitudinal direction of the shaft, that the shaft is provided with a pin which engages in the slot, and that two springs are each disposed between an axial end face of the valve element and an opposed abutment. In this embodiment, the coupling between the shaft and the valve element that can be rotatably displaced is effected by a slotted guideway, wherein the forces which in operation are exerted on the valve sleeve by the slotted guideway and act parallel to the longitudinal axis of the shaft are smaller than the forces exerted by the two springs. In this way, the valve sleeve is always centered towards its neutral position, and there is obtained a self-locking due to friction.

In accordance with yet another embodiment of the invention, it is provided that the coupling mechanism has a spring ring which is provided with a plurality of tabs and is mounted at the shaft, and that the valve element associated to the coupling mechanism has a plurality of lugs which cooperate with the tabs. The spring ring can be made of plastics or an elastomer. This structure reminds of a claw coupling with damping elements and provides for the required relative rotation between the valve element and the shaft.

Other advantages of this invention will become apparent to those skilled in the art from the following detailed description of the preferred embodiment, when read in light of the accompanying drawings.

BRIEF DESCRIPTION OF THE DRAWINGS

The invention will subsequently be described with reference to various embodiments which are represented in the attached drawings, in which:

FIG. 1 shows a schematic view of a steering gear with a valve in accordance with a first embodiment of the invention;

FIG. 2 shows a detail of a valve in accordance with a second embodiment of the invention;

FIG. 4 to FIG. 11 show various embodiments of a steering gear with different drive means.

DETAILED DESCRIPTION OF THE INVENTION

Figure 3:
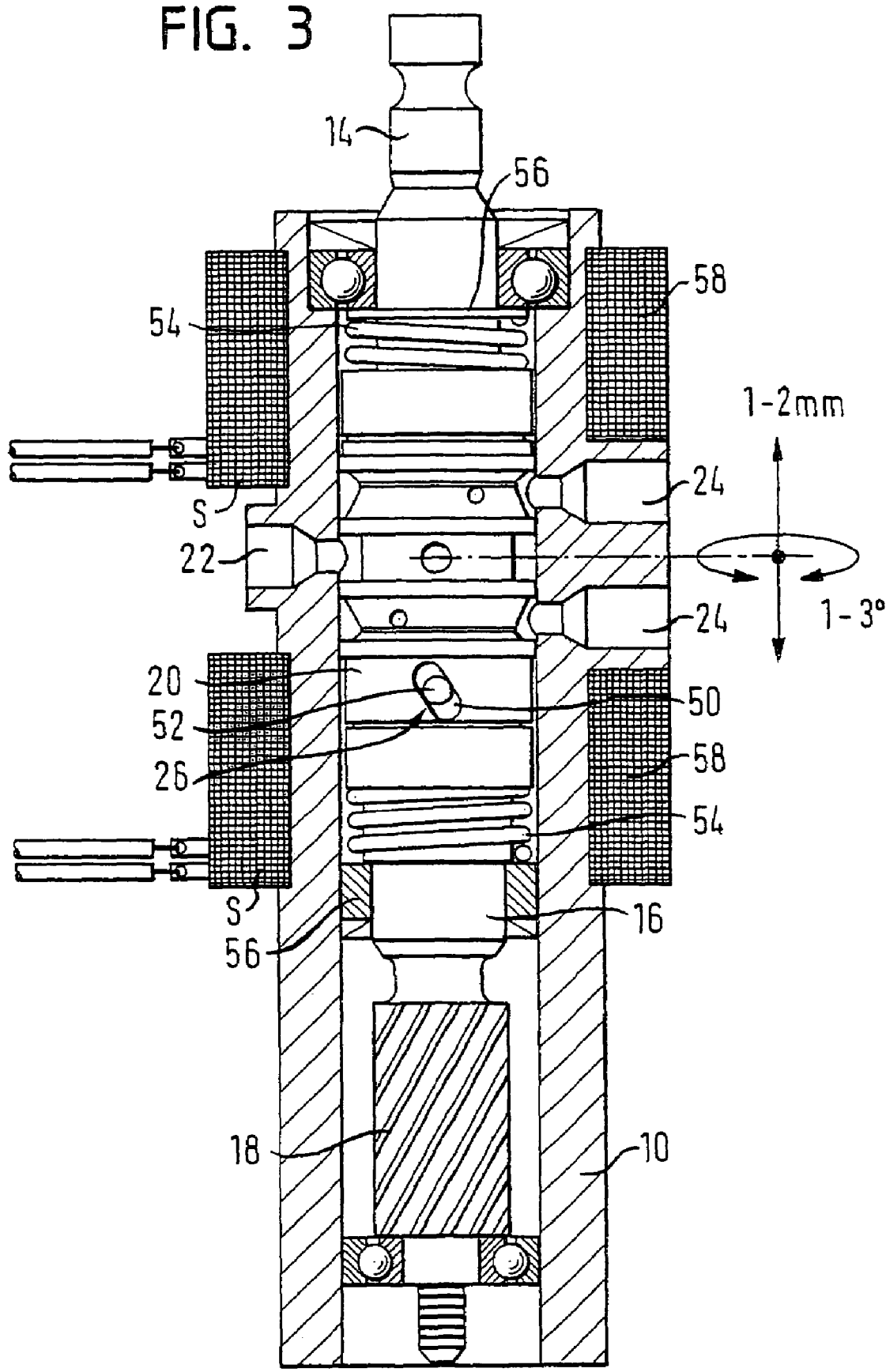
FIG. 3 shows a steering gear with a valve in accordance with a third embodiment of the invention.

FIG. 1 shows a steering gear 10 which has a valve 12 by means of which a power assistance can be determined. The steering gear 10 has an input shaft 14 which is actuated by a steering wheel, and an output shaft 16 which is provided with a pinion 18. The pinion 18 engages in a rack (not shown) by means of which the steerable wheels of a vehicle are swivelled.

Between the input shaft 14 and the output shaft 16 a torsion bar (not shown) is disposed, which connects the two shafts with each other such that they can be rotatably displaced relative to each other by overcoming the torsional resistance of the torsion bar. The input shaft 14 furthermore is provided with an inner valve sleeve (not visible in the representation of FIG. 1), which is connected for joint rotation with the input shaft 14. Around the inner valve sleeve, an outer valve sleeve 20 extends, which is provided with an inlet bore 22 and two outlet bores 24. When the two valve sleeves are in a central position, the two outlet bores 24 are symmetrically supplied with a hydraulic fluid which is supplied via the inlet bore 22. This is generally known from the prior art and will not be explained here in greater detail.

The outer valve sleeve 20 is rotatably disposed on the output shaft 16 and connected with the same by a coupling mechanism 26. Here, the coupling mechanism 26 consists of two abutments 28, which are firmly mounted at the output shaft 16, a stop 30, which is firmly mounted at the outer valve sleeve 20, and two springs 32, which in peripheral direction are disposed between the one abutment and the stop 30 as well as between the stop 30 and the second abutment 28. The coupling mechanism 26 centers the outer valve sleeve 20 relative to the output shaft 16 into a neutral position, which corresponds to the position in which the outer valve sleeve is firmly connected with the output shaft 16 in the case of conventional valves. The possible angle of rotation of the outer valve sleeve 20 relative to the output shaft 16 lies in the order of 1° to 4°.

There is provided a drive motor 34 which is connected with the outer valve sleeve 20 via a gear transmission 36. Alternatively, there can also be used a belt drive.

There is furthermore provided an electronic control unit 38 which from a torque sensor 39 receives information on the steering torque $D_S$ and a correction torque $\Delta D$ desired for changing the steering characteristic. For an autonomous steering, there is also provided an angle sensor (not shown). The control unit, on the other hand, outputs a signal for generating an engine torque $D_{M\pm}$, which can be transmitted to the outer valve sleeve 20.

In normal operation, the drive motor 34 is freely rotatable, so that in the case of steering movements it will rotate corresponding to the then occurring rotation of the outer valve sleeve 20. For this purpose, the springs 32 are designed so stiff that the torque required for the displacement in rotation of the valve sleeve 20 from its neutral position is larger than the drag moment of the drive motor 34. Thus, the valve 12 operates in a conventional way.

When it is detected that the steering characteristic should be influenced, the drive motor 34 is operated in the one or other direction. The valve sleeve 20 is thereby moved out of its neutral position, so that the relative position between the inner valve sleeve and the outer valve sleeve will change.

Should the control unit 38 or the drive motor 34 fail, this does not impair the safe function of the valve 12, as the valve sleeve 20 will then remain in its neutral position.

FIG. 2 shows a variant of the embodiment shown in FIG. 1. The difference consists in that instead of the springs provided in the first embodiment, the coupling mechanism 26 has a spring ring 40, which is made of plastics or an elastomer material. The spring ring 40 is firmly connected with the output shaft 16 and has a plurality of tabs 42 which extend in axial direction between a plurality of lugs 44, which are mounted at the outer valve sleeve 20. This coupling mechanism, too, holds the outer valve sleeve 20 in a neutral position relative to the output shaft 16, while at the same time allowing a displacement in rotation about a limited angular range in the one or other direction.

In FIG. 3, a third embodiment is shown. For the components known from the first embodiment the same reference numerals are used, and in so far reference is made to the above explanations.

The difference to the two preceding embodiments consists in that the coupling mechanism substantially consists of a slotted guideway, which here is formed by a slot 50 in the outer valve sleeve 20 and a pin 52 which is inserted in the output shaft 16. Of course, the opposite arrangement with a slot in the output shaft and a pin in the valve sleeve would also be conceivable. The slot 52 extends in a straight line, its longitudinal axis being disposed at an angle with respect to the longitudinal axis of the output shaft 16. In the illustrated embodiment, this angle is about 30°. Instead of a straight slot, there can also be used a curved slot. In this way, there can also be achieved a non-linear gear ratio.

On each end face of the valve sleeve 20 a spring 54 is disposed, whose end facing away from the valve sleeve is each biased against an abutment 56. The springs 54 urge the valve sleeve 20 into its neutral position along the longitudinal axis of the output shaft 16.

Around the valve, two coils 58 are disposed, which allow to adjust the valve sleeve 20 by means of electromagnetic forces parallel to the longitudinal axis of the output shaft 16 in the one or other direction from a neutral position. The coils 58 are connected with the control unit 38.

When no force is exerted by the coils on the valve sleeve 20, the same will remain in its neutral position with each actuation of the steering gear, into which neutral position it is urged by the springs 54. It is true that with each displacement in rotation of the output shaft 16 the pin 52 exerts a force on the valve sleeve 20 via the slot 50. However, the component of this force directed parallel to the longitudinal direction of the output shaft 16 is not sufficient to adjust the valve sleeve 20 in longitudinal direction against the action of the springs 54 and also against the friction existing between the slot 50 and the pin 52. Thus, the valve sleeve 20 also remains in its angular position corresponding to the neutral position.

When the steering characteristic of the valve should be influenced, the coils 58 are excited. The valve sleeve 20 is thereby moved in axial direction, which due to the inclined guidance of the pin 52 in the slot 50 is converted into a displacement in rotation of the valve sleeve 20 relative to the output shaft 16.

In accordance with a variant not shown here, the valve sleeve can also have an elongated design, the elongated portion acting as piston. This also allows to act on the valve sleeve in the desired way.

Figure 4:
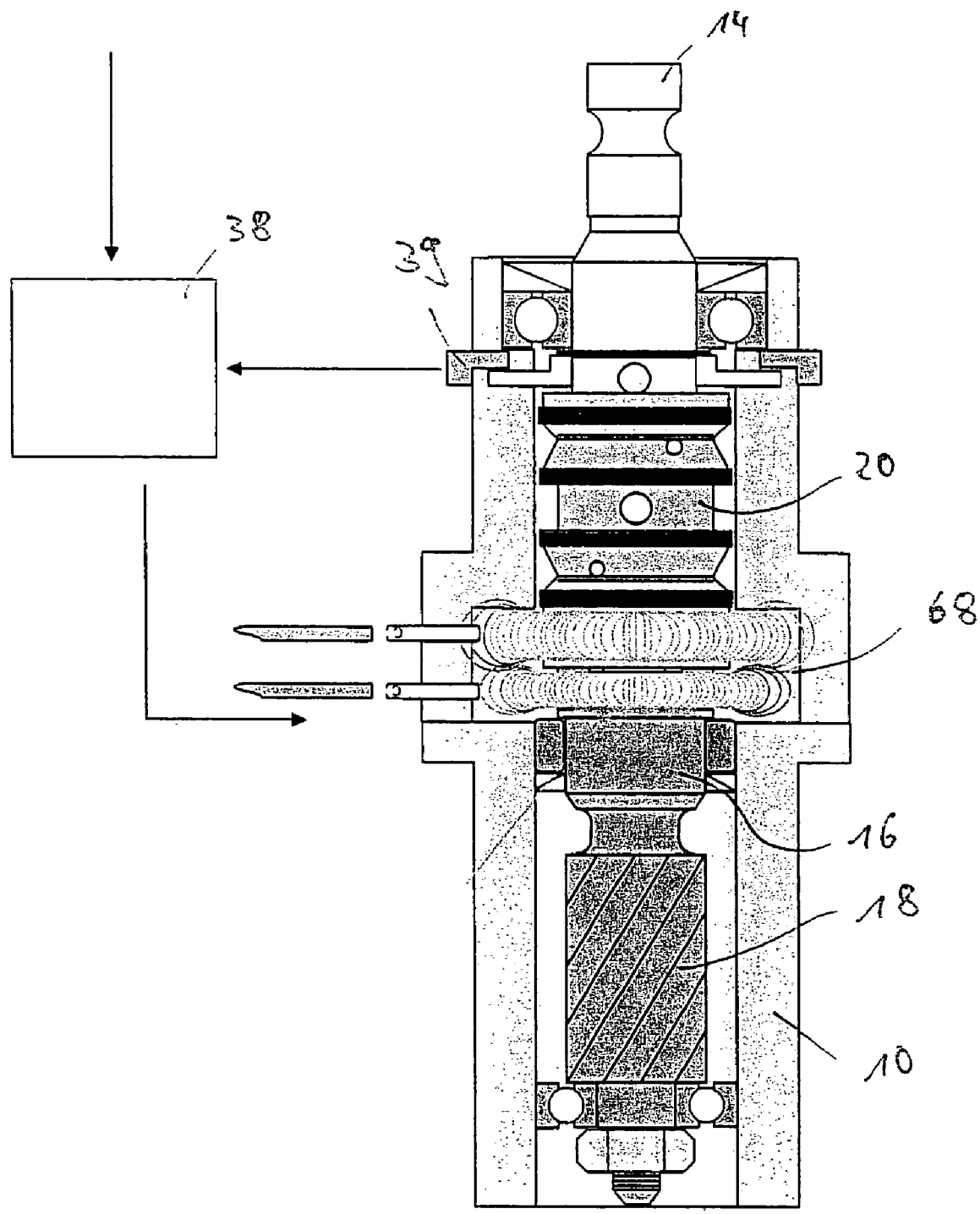

FIG. 4 shows a further embodiment of the valve, a drive means 68 being used here which consists of coils that are coaxially disposed around the valve axis.

Figure 5:
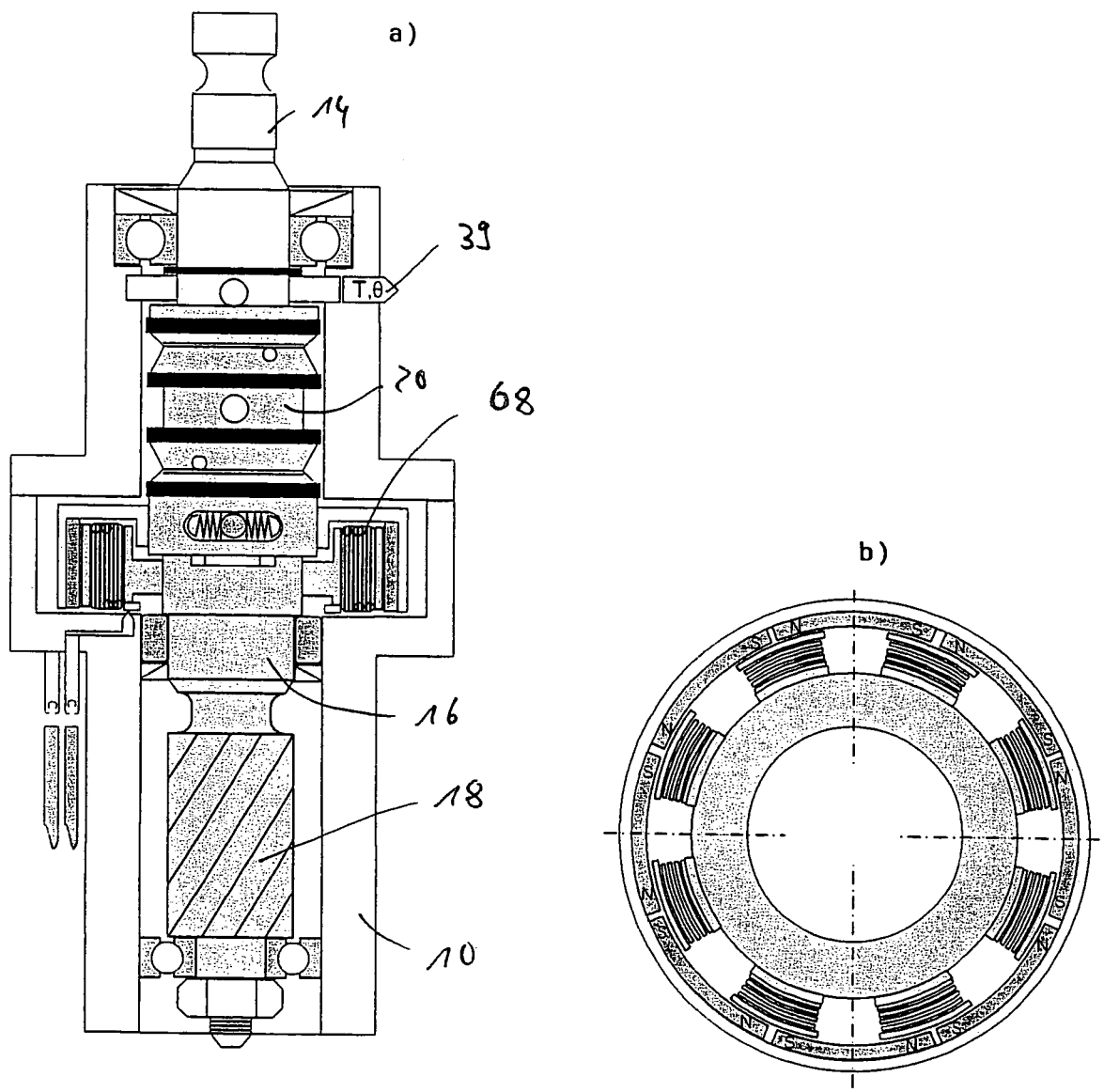

FIG. 5 shows an embodiment of the valve in which two rotors of an electric motor are used as drive means 68. Here, one rotor supports for example the permanent magnets and the other rotor the exciter coils. Analogously to the electric motor, the adjusting moment results from the forces that act on a current-carrying conductor in the magnetic field. In the embodiment shown, the permanent magnets are disposed on a holder which is firmly connected with the valve sleeve and the coils are disposed on a holder which is firmly connected with the shaft 16. Due to the high number of poles a high torque occurs which can be further increased by poles that are longer in the axial direction. An electric cable or sliding contacts can be used for the power supply.

FIG. 6 shows a further embodiment of the valve with the drive means 68. An electric motor with a disk armature and axial flow through the coils is used for the drive means. Here, the coils are located on a non metallic armature disk made of plastic, for example, which allows higher adjusting dynamics due to the low moment of inertia. There are basically different possibilities for the arrangement of both rotors. The rotor with the permanent magnets can be located on the valve sleeve and the rotor with the coils can be arranged on the shaft 16. In case a lower efficiency is sufficient, it is possible to use only one magnetic film instead of both magnetic films shown. This is shown in Fig. c).

FIG. 7 shows an embodiment in which the permanent magnets are disposed on a holder which is connected with the shaft 16. The coils are mounted to a holder which is firmly provided at the valve sleeve.

The advantage of the embodiments shown in FIGS. 4 to 7 is that the drive means 68 must create only the additional and actively driven angle of displacement in rotation of the valve of about plus/minus 3°. In higher steering angles of 700° for example in the one or other direction, both rotors move synchronously. Thus, a commutation is not necessary, a disturbing torque variation does thus not occur. However, the disadvantage is that the coils have to be supplied with current via slides or via a cable loop.

In contrast to the embodiments shown in FIGS. 4 to 7, one of the two rotors can also be arranged on the housing of the valve, namely the permanent magnet ring (cf. FIG. 8) or the coils (cf. FIG. 9). The disadvantage of these two embodiments is that the drive means has to create the small valve adjusting angle and additionally the large, higher steering angle. Here, a commutation is necessary which leads to higher construction expenditures as well as to an undesired variation of moments. Furthermore, the valve zeroizing has to be balanced hydraulically and electromagnetically during the assembling. The great advantage of these two embodiments with coils that are firmly connected with the housing is however the fact that slides or a cable loop for the power supply become unnecessary.

Figure 10:
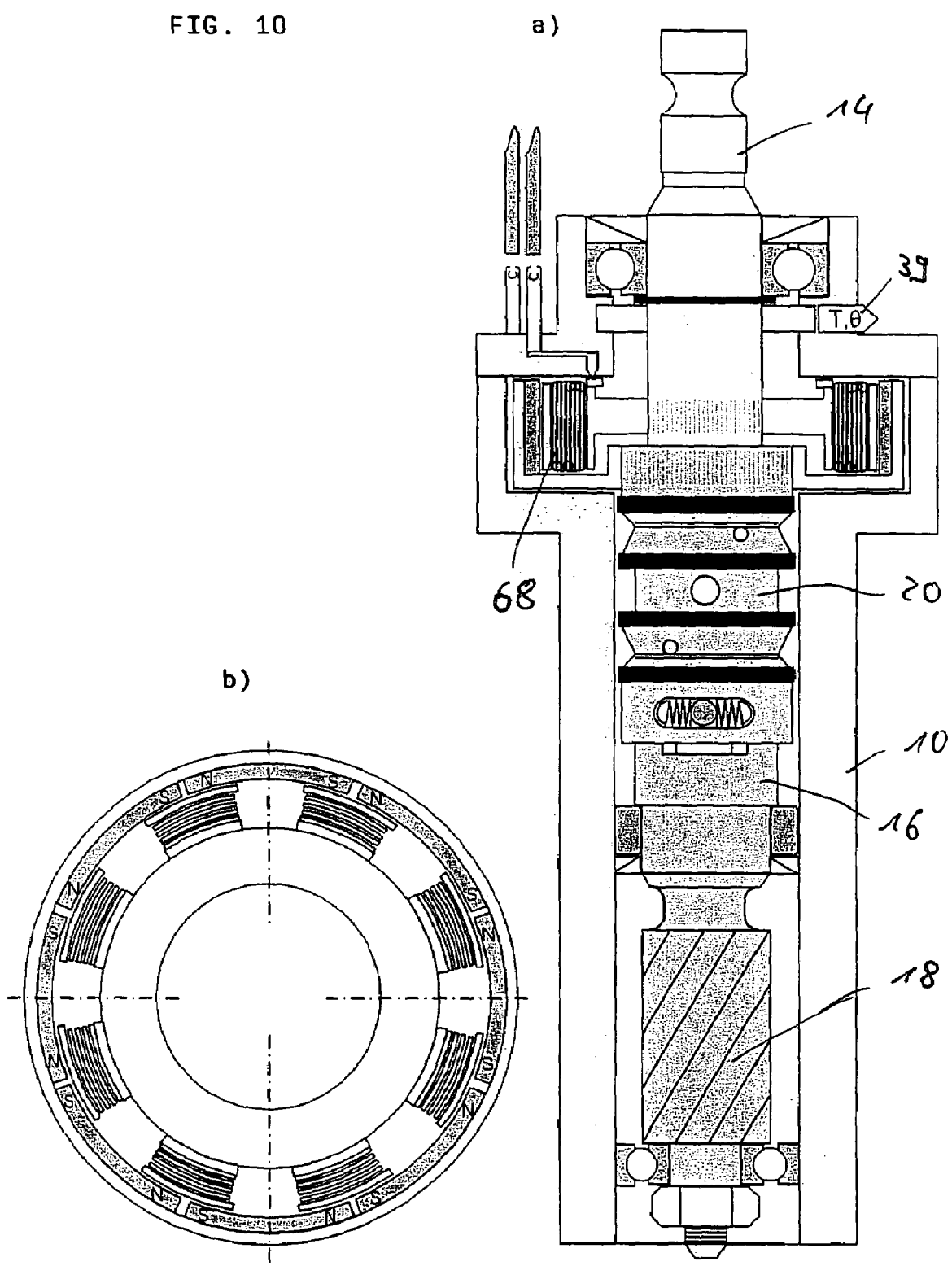
Figure 11:
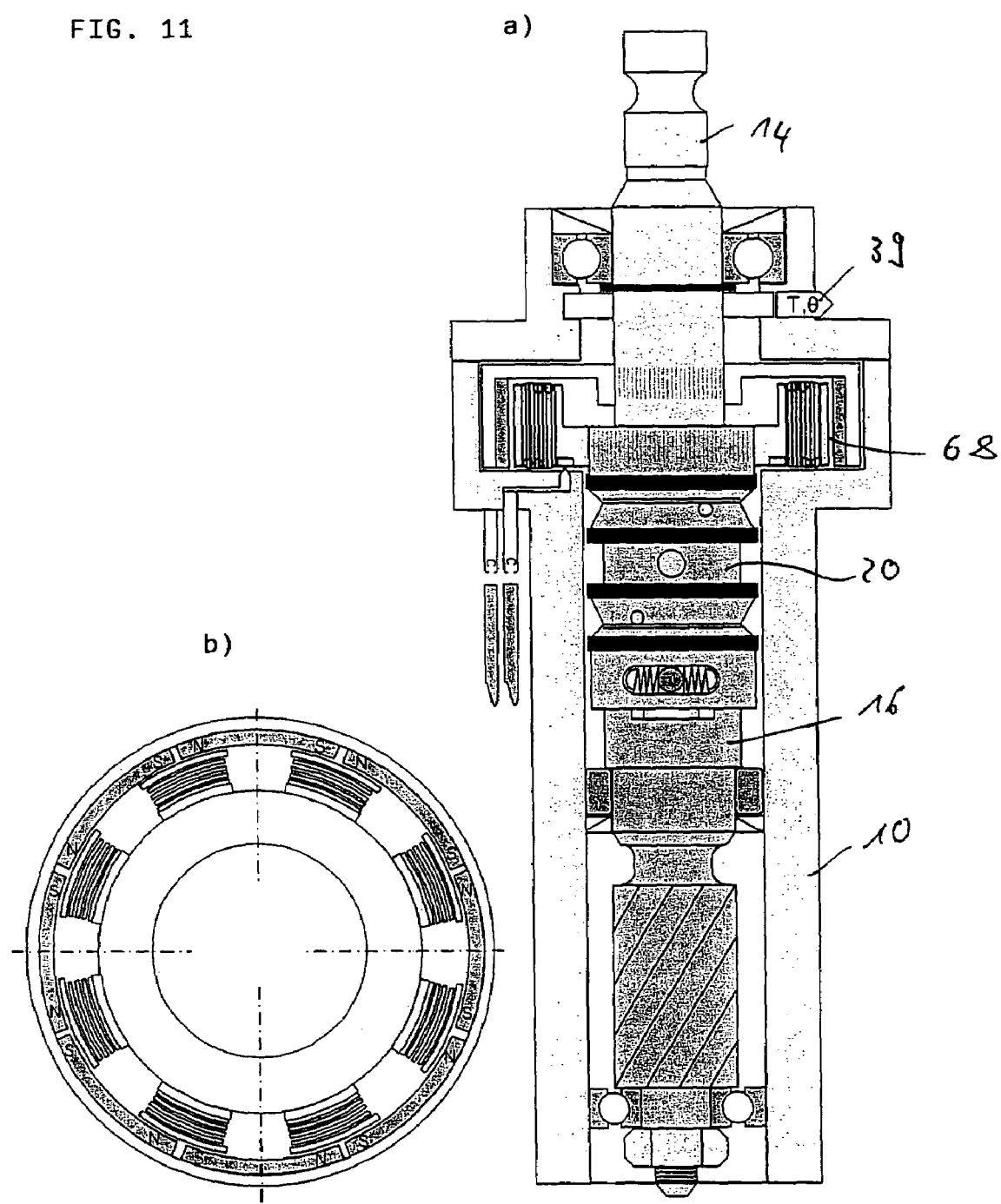

Alternative embodiments arise when one of the rotors is mounted to the input shaft 14. In the embodiment of FIG. 10, the coils are mounted to the input shaft, and in the embodiment according to FIG. 11 the permanent magnets are firmly mounted to the input shaft. The controlling moment of the drive means 68 displaces the valve sleeve 20 in rotation relative to the shaft 16 and the input shaft 14. The reaction moment rests on the driver via the input shaft and the steering column. This mechanical additional moment acts in the same direction as the mechanical-hydraulic additional moment obtained via the valve adjustment. This is advantageous in the range of small valve excursion, where due to the low pressure level the possible mechanical-hydraulic supporting moments are lower. Here, the moment regulator must always cover a valve operation range of plus/minus 6°. Since here, the excursion of the moment regulator corresponds to the entire valve excursion, there is basically the possibility to use this excursion for measuring the moments. The relative displacement of the coils with respect to the magnetic field causes a modification of the electromagnetic characteristics, which causes a modified velocity of the current increase, for example. A sensing of these or other values may be used for the determination of the angle of displacement in rotation and for the determination of moments. With regard to the construction space, the arrangement of the drive means above the valve is better than the arrangement below the valve.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position, wherein the coupling mechanism has two springs which act in the peripheral direction of the shaft and which urge the associated valve element into the neutral position, and wherein the valve element associated to the coupling mechanism is provided with a stop, that at the shaft two abutments are provided, one of which is disposed on the one side and the other on the other side of the stop, and that one of the two springs is disposed between the one abutment and the stop and the other spring is disposed between the stop and the other abutment.

2. The valve as claimed in claim 1, wherein the valve element associated to the coupling mechanism is provided with a slot which is aligned at an angle with respect to the longitudinal direction of the shaft, that the shaft is provided with a pin which engages in the slot, and that the two springs are each disposed between an axial end face of the valve element and an opposed abutment.

3. The valve as claimed in claim 2 wherein the angle between the longitudinal direction of the slot and the longitudinal axis of the shaft is less than 45°.

4. The valve as claimed in claim 1, wherein the valve element associated to the coupling mechanism is provided with a pin, that the shaft is provided with a slot which is aligned at an angle with respect to the longitudinal direction of the shaft and in which engages the pin, and that the two springs are each disposed between an axial end face of the valve element and an opposed abutment.

5. The valve as claimed in claim 1, wherein the coupling mechanism has a spring ring.

6. The valve as claimed in claim 5, wherein the spring ring has a plurality of tabs and is mounted at the shaft, and that the valve element associated to the coupling mechanism has a plurality of lugs which cooperate with the tabs.

7. The valve as claimed in claim 1, wherein a drive means provided, which can act on the valve element associated to the coupling mechanism, in order to displace the same in rotation relative to the shaft from the neutral position into the one or other direction.

8. The valve as claimed in claim 7, wherein the drive means has an electric motor.

9. The valve as claimed in claim 7, wherein the drive means has at least one coil.

10. The valve as claimed in claim 7, wherein the drive means has a coil holder and a permanent magnet holder.

11. The valve as claimed in claim 10, wherein one of the holders is firmly connected with the valve element and the other holder is firmly connected with the housing of the valve.

12. The valve as claimed in claim 1, wherein the coupling mechanism limits the displacement in rotation of the valve element relative to the shaft to an angular range of maximally 3° in each direction.

13. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position wherein the coupling mechanism has two springs which act parallel to the longitudinal axis of the shaft and which urge the associated valve element into the neutral position.

14. The valve as claimed in claim 13, wherein the valve element associated to the coupling mechanism is provided with a slot which is aligned at an angle with respect to the longitudinal direction of the shaft, that the shaft is provided with a pin which engages in the slot, and that the two springs are each disposed between an axial end face of the valve element and an opposed abutment.

15. The valve as claimed in claim 13, wherein the valve element associated to the coupling mechanism is provided with a pin, that the shaft is provided with a slot which is aligned at an angle with respect to the longitudinal direction of the shaft and in which engages the pin, and that the two springs are each disposed between an axial end face of the valve element and an opposed abutment.

16. The valve as claimed in claim 14 wherein the angle between the longitudinal direction of the slot and the longitudinal axis of the shaft is less than 45°.

17. The valve as claimed in claim 13, wherein the coupling mechanism has a spring ring.

18. The valve as claimed in claim 17, wherein the spring ring has a plurality of tabs and is mounted at the shaft, and that the valve element associated to the coupling mechanism has a plurality of lugs which cooperate with the tabs.

19. The valve as claimed in claim 13, wherein a drive means provided, which can act on the valve element associated to the coupling mechanism, in order to displace the same in rotation relative to the shaft from the neutral position into the one or other direction.

20. The valve as claimed in claim 19, wherein the drive means has an electric motor.

21. The valve as claimed in claim 19, wherein the drive means has at least one coil.

22. The valve as claimed in claim 19, wherein the drive means has a coil holder and a permanent magnet holder.

23. The valve as claimed in claim 22, wherein one of the holders is firmly connected with the valve element and the other holder is firmly connected with the housing of the valve.

24. The valve as claimed in claim 13, wherein the coupling mechanism limits the displacement in rotation of the valve element relative to the shaft to an angular range of maximally 3° in each direction.

25. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position, wherein the coupling mechanism has a spring ring, wherein the spring ring has a plurality of tabs and is mounted at the shaft, and that the valve element associated to the coupling mechanism has a plurality of lugs which cooperate with the tabs, and wherein the spring ring is made of an elastomer or plastic material.

26. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position, wherein a drive means provided, which can act on the valve element associated to the coupling mechanism, in order to displace the same in rotation relative to the shaft from the neutral position into the one or other direction, wherein the drive means has a coil holder and a permanent magnet holder, and wherein one of the holders is firmly connected with one of the valve elements and the other holder is firmly connected with the shaft.

27. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position, wherein a drive means provided, which can act on the valve element associated to the coupling mechanism, in order to displace the same in rotation relative to the shaft from the neutral position into the one or other direction, wherein the drive means has a coil holder and a permanent magnet holder, and wherein one of the holders is firmly connected with the input shaft and the other holder is firmly connected with the valve element.

28. A valve for a hydraulic power steering, comprising a first valve element and a second valve element, which from a central position can be rotatably displaced relative to each other to a limited extent in the one or other direction, in order to generate a steering assistance, wherein one of the valve elements can be rotatably displaced from a neutral position into the one or other direction relative to an associated shaft, and wherein a coupling mechanism is provided, which limits the displacement in rotation of the valve element relative to the shaft and urges the valve element into the neutral position, wherein a drive means provided, which can act on the valve element associated to the coupling mechanism, in order to displace the same in rotation relative to the shaft from the neutral position into the one or other direction, wherein the drive means has a coil holder and a permanent magnet holder, and wherein one of the holders is firmly connected with one of the valve elements and the other holder is firmly connected with the shaft, and wherein the shaft is the output shaft of the valve and is connected with a pinion which is part of the steering gear.

* * * * *